US007100683B2

(12) United States Patent
Heilmann et al.

(10) Patent No.: US 7,100,683 B2
(45) Date of Patent: Sep. 5, 2006

(54) IN-WELL AERATION DEVICE

(75) Inventors: Albert R. Heilmann, West Warwick, RI (US); David Beretta, III, East Greenwich, RI (US)

(73) Assignee: AMTROL Inc., West Warwick, RI (US)

( * ) Notice: Subject to any disclaimer, the term of this patent is extended or adjusted under 35 U.S.C. 154(b) by 282 days.

(21) Appl. No.: 10/773,623

(22) Filed: Feb. 6, 2004

(65) Prior Publication Data

US 2005/0173107 A1 Aug. 11, 2005

(51) Int. Cl.
*E21B 43/00* (2006.01)
*C02F 9/08* (2006.01)

(52) U.S. Cl. ........................ 166/68; 210/136; 210/170; 210/198.1; 210/258

(58) Field of Classification Search .................. 166/68, 166/265; 210/747, 170, 136, 198.1, 258, 210/758; 405/128.25
See application file for complete search history.

(56) References Cited

U.S. PATENT DOCUMENTS

| | | | | |
|---|---|---|---|---|
| 3,102,799 | A * | 9/1963 | Kiekhaefer | 96/157 |
| 4,457,375 | A | 7/1984 | Cummins | 166/309 |
| 5,044,440 | A | 9/1991 | Stinessen et al. | 166/344 |
| 5,104,554 | A * | 4/1992 | Dempsey | 210/747 |
| 5,302,286 | A * | 4/1994 | Semprini et al. | 210/610 |
| 5,354,459 | A | 10/1994 | Smith | 210/188 |
| 5,582,777 | A | 12/1996 | Vento | |
| 5,620,593 | A | 4/1997 | Stagner | |
| 5,755,288 | A | 5/1998 | Bearden et al. | 166/370 |
| 6,312,605 | B1 | 11/2001 | Kerfoot | |

FOREIGN PATENT DOCUMENTS

| | | |
|---|---|---|
| DE | 3644120 | 7/1988 |
| DE | 198 45 545 | 8/1999 |
| EP | 0 144 659 | 10/1984 |
| EP | 1 116 695 | 7/2001 |
| GB | 822671 | 10/1959 |

* cited by examiner

*Primary Examiner*—Jennifer H. Gay
*Assistant Examiner*—Robert Fuller
(74) *Attorney, Agent, or Firm*—Scott D. Wofsy; Edwards Angell Palmer & Dodge LLP

(57) ABSTRACT

An in-well aeration device which includes a water pumping section disposed within the well for drawing water from the well, an aerating section operatively connected to the water pumping section for drawing air into the well and subsequently injecting the air into the well water above the level of the water pumping section, and a motor operatively connected to the water pumping section and the aerating section for operating both sections simultaneously.

25 Claims, 3 Drawing Sheets

IN-WELL AERATION DEVICE

BACKGROUND OF THE INVENTION

1. Field of the Invention

The subject invention is directed to a device for aerating water within a well, and more particularly, to a well pump having an integral air injection system for aerating well water to effectively remove objectionable contaminants therefrom.

2. Background of the Related Art

In many areas of the country, well water contains objectionable impurities such as dissolved iron, manganese or hydrogen sulfide. For example, if the water contains dissolved iron it will tend to oxidize when exposed to air, which causes the iron to precipitate out of solution. These precipitates cause rust-colored stains, which are difficult to remove from porcelain surfaces such as toilet bowls, sinks and tubs. The hydrogen sulfide is disagreeable because of its characteristic rotten egg odor.

Homeowners have typically eliminated objectionable contaminants from water using a softener and filtration system, but such units are not effective to remove moderate to high levels of dissolved iron and hydrogen sulfide. Aeration systems have also been used to oxidize dissolved solids before they enter the household plumbing. Such systems have been installed within the home in conjunction with a pressure tank and within the well itself. These aeration systems are designed to cause dissolved solids to precipitate out of the water. In the case of an in-home aeration system, the oxidized solids must be filtered from the water.

In-home aeration systems tend to be far more expensive than in-well aeration systems and require a relatively large space to accommodate the filtration equipment. In contrast, with an in-well aeration system, oxidized solids tend to settle at the bottom of the well, and subsequent filtration of the water prior to use is generally not required. However, in-well aeration systems use an air compressor that is typically located in the home remote from the well pump, requiring additional space in a location already occupied by the water storage tank and possibly a water softening system.

Another problem associated with well water is radon, a naturally occurring, water soluble radioactive gas that results from the breakdown of uranium in soil, rock and water. Radon has been reported to be the second leading cause of lung cancer in the United States. There are two known methods of treating water contaminated by radon gas, namely, aeration and activated carbon filtration. The aeration method involves introducing air into the water supply to increase the gas-liquid interface, thereby allowing the radon gas dissolved in the water to diffuse into the gas phase, as disclosed in U.S. Pat. No. 6,287,369 to Osmond. The air/radon gas mixture is then vented from the water supply and the water is delivered for use. Radon removal systems are typically complex and thus relatively expensive to install and maintain.

Clearly a need exists for an improved in-well aeration system that overcomes the deficiencies of the prior art. More particularly, there is a need in the art for an inexpensive and energy efficient in-well aeration device for removing or otherwise releasing dissolved contaminants from well water.

SUMMARY OF THE INVENTION

The subject invention is directed to a new and useful device for aerating water in a well. The device includes a water pumping section for drawing water from the well, and an aerating section operatively connected to the primary water pumping section for drawing air into the well and subsequently injecting the air into the well water above the level of the primary water pumping section. The device also includes a motor that is operatively connected to the primary water pumping section and the aerating section for operating both sections simultaneously.

In one embodiment of the subject invention, the aerating section of the device includes a compressor section located below the level of the primary water pumping section. The compressor section is adapted and configured to draw air into the well through an air inlet tube. The compressor section is further adapted and configured to discharge compressed air into the well water through an air discharge tube that has an outlet port located above the level of the primary water pumping section.

In another embodiment of the subject invention, the aerating section of the device includes a secondary water pumping section located below the level of the primary water pumping section. The aerating section further includes a venturi tube in communication with the secondary water pumping section. The venturi tube has a first inlet configured to communicate with the secondary water pumping section and a second inlet configured to communicate with an air inlet tube. The venturi tube is adapted and configured to discharge aerated water into the well water through an air discharge tube having an outlet port located above the level of the primary water pumping section.

In yet another embodiment of the subject invention, the aerating section of the device includes a secondary water pumping section that has a first inlet communicating with an air inlet tube, and a second inlet located below the level of the water inlet of the primary water pumping section for drawing in well water. In this instance, the secondary water pumping section is adapted and configured to discharge aerated water into the well water through a discharge tube having an outlet located above the level of the primary water pumping section.

These and other aspects of the in-well aeration device of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the present invention pertains will more readily understand how to make, use and install the in-well aeration device of the present invention, embodiments thereof will be described in detail hereinbelow with reference to the drawings, wherein.

DETAILED DESCRIPTION OF PREFERRED EMBODIMENTS

Figure 1:
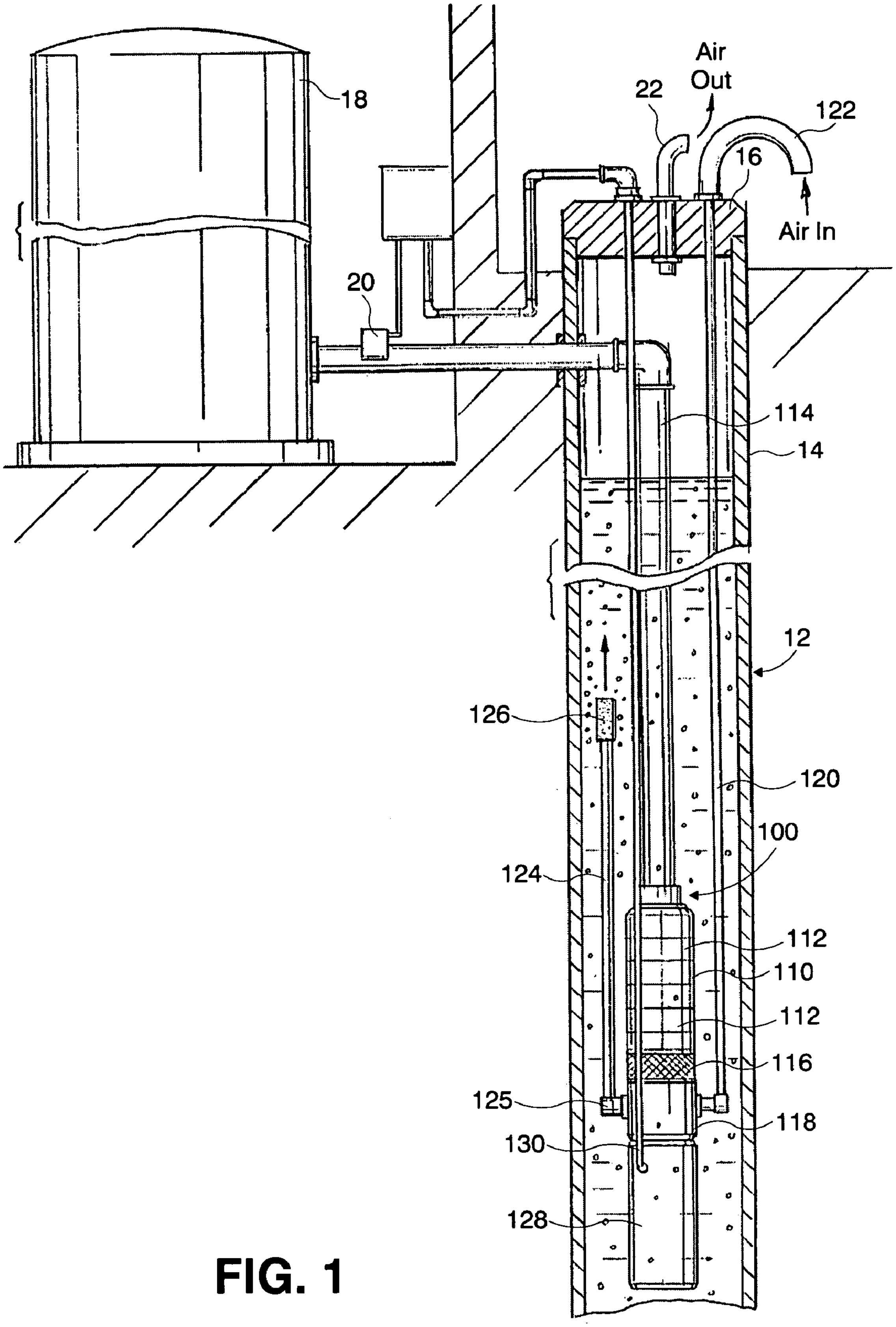
FIG. 1 is a side elevational view in cross-section of a well casing which contains an in-well aeration device constructed in accordance with a preferred embodiment of the subject invention, which has a water pumping section for drawing water from the well and an air compressor section configured to draw air into the well and discharge the air above the level of the water pumping section.

Referring now to the drawings wherein like reference numerals identify similar structural elements or features of the various embodiments of the subject invention, there is illustrated in FIG. 1 a novel submersible device for aerating well water, which is constructed in accordance with a preferred embodiment of the subject invention and designated generally by reference numeral 100. The submersible aeration device 100 of the subject invention is multi-functional in that it is configured to aerate the water column within the well casing and simultaneously pump the aerated water therefrom.

Aeration serves to remove dissolved solids such as iron, manganese or sulfur from the well water column, by causing the solids to oxidize and precipitate out of the water column to the bottom of the well. In addition, aeration serves to remove dissolved radon from the water column, by causing the radon gas to diffuse into the gas phase and vent from the well casing.

Referring to FIG. 1, the aeration device 100 of the subject invention is preferably associated with a residential well 12 that includes a well casing 14 having a vented well cap 16. Well casings for residential use range in depth. For example, wells may be drilled as shallow as 30 feet or as deep as 200 feet, or more in some instances. Casings for residential wells generally have a diameter of either 4 inches or 6 inches. However, wells that are dug rather than drilled may have a diameter in the 2 to 4 foot range and a depth ranging from about 10 feet to 50 feet, or more.

Aeration device 100 includes a pumping section characterized by a water pump 110 having an elongated cylindrical shape that fits easily within a well casing. The pump can range from ½ to 5 horsepower depending upon the depth of the well and may have a capacity in the range of 5 to 80 gpm depending upon demand. Internally, the pump 110 is comprised of a series of stacked impellers 112, each separated by a diffuser (not shown) that drives or moves well water to a water storage tank 18. The water storage tank 18 is located within the residence and receives water from the pump 110 by way of a water supply conduit 114. The storage tank 18 is pressurized and delivers water to the household plumbing system upon demand. The pump 110 of aeration device 100 includes a screened inlet region 116 for admitting well water into the device. The screening at the inlet region 116 serves as a gross filter to prevent debris from being drawn into the pump 110 of aeration device 100.

Aeration device 100 further includes an aerating section consisting of an air compressor 118 positioned beneath the screened inlet region 116 of pump 110. Air compressor 118 is of a relatively low horsepower and is suitable for residential service. The compressor 118 draws air into the well casing 14 through an air supply conduit 120. Air supply conduit 120 extends up through the well cap 16 to an inlet tube 122 located at the surface. Inlet tube 122 is configured to prevent water and debris from entering supply conduit 120. In addition, a check valve 125 is disposed in the air discharge line 124 to prevent water from reaching the compressor 118.

In accordance with the subject invention, air is discharged from compressor 118 and injected into the well water column through an air outlet conduit 124. The exit port of outlet conduit 124 is positioned only a small distance above pump 110. This ensures that the water pumped from the well will always be sufficiently aerated. For example, the exit port of conduit 124 may be about one foot above the top of pump 110. An air diffuser 126 formed from porous stone or a suitable sintered material may be fit on the exit port of outlet conduit 124 to enhance air dispersion.

An electric motor 128 suited for underwater service is positioned below the air compressor 118, and is operatively connected to the water pump 110 and air compressor 118 for operating both sections simultaneously. Motor 128 is also operatively connected through wiring conduit 130 to a conventional pressure switch 20 (see FIG. 1), which, in turn, is wired to a pressure gauge mounted on the storage tank 18. The pressure 20 switch starts the motor 128, and hence the pump 110 and compressor 118, when the pressure within the storage tank 18 drops to a certain level, e.g., 20 psi. The pressure switch 20 will subsequently stop the motor 128 when the pressure within the storage tank 18 reaches a preset level, which may be anywhere from 40 to 60 psi.

When the motor 128 is running, air is drawn into the compressor 118 through air supply conduit 120 and dispersed into the water column through outlet conduit 124. At the same time, aerated water is drawn into the pump 110 through screened inlet region 116 and is delivered to the storage tank 18 by way of water supply conduit 114. During this period of operation, the radon within the water column is diffused into a gaseous state, causing the harmful gas to exit the well casing 14 through the vent 22 in well cap 16. In addition, the dissolved solids in the water column are oxidized, causing these impurities to precipitate out of solution and fall to the bottom of the well. It is envisioned that vent 22 can include a check valve or similar mechanism to prevent water and debris from entering the well.

Figure 2:
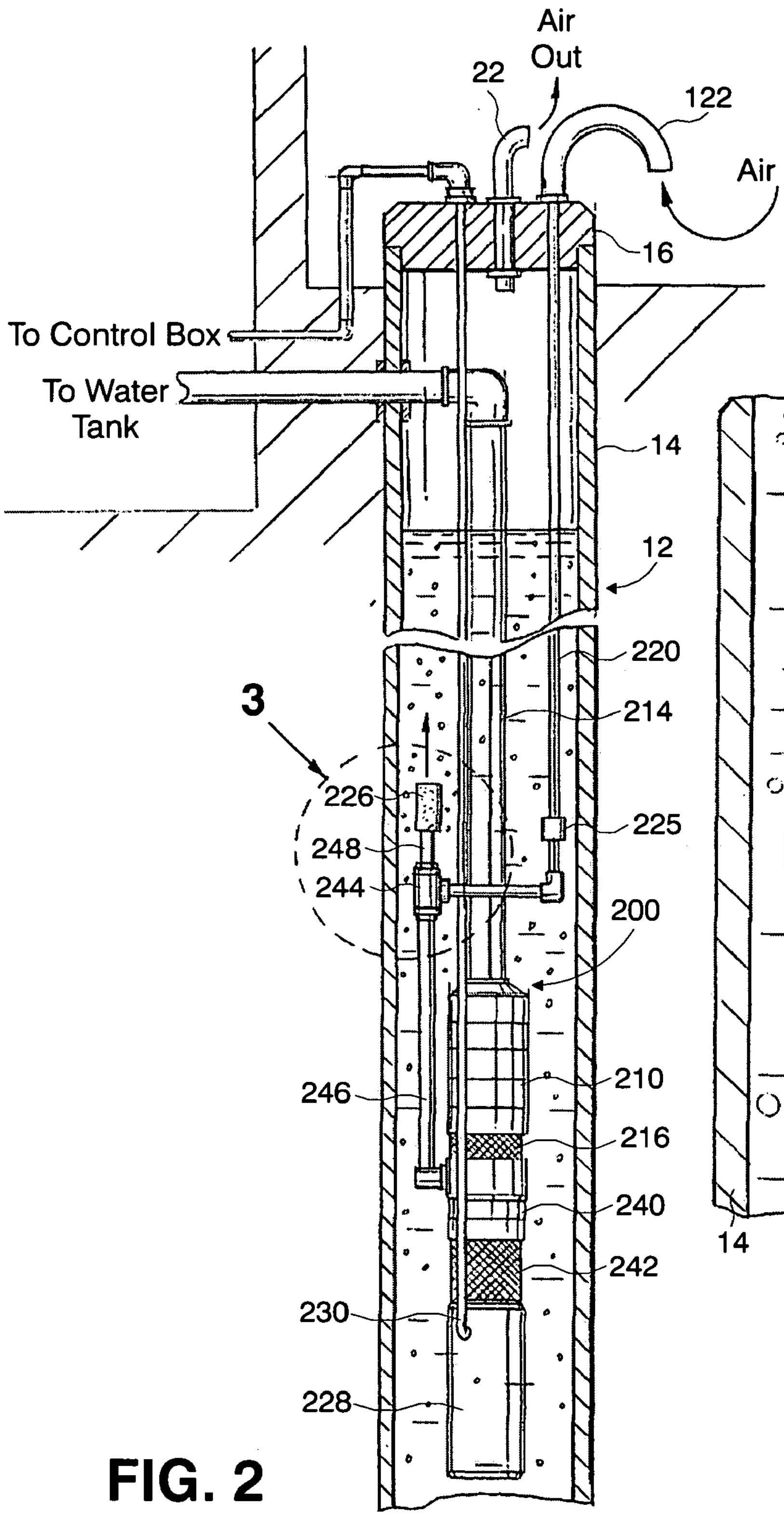
FIG. 2 is a side elevational view in cross-section of a well casing which contains another in-well aeration device constructed in accordance with a preferred embodiment of the subject invention, which has a primary water pumping section for drawing water into the well and a secondary water pumping section which communicates with a venturi tube configured to draw air into the well casing and discharge the aerated water into the well water column above the level of the primary water pumping section.

Referring now to FIG. 2, there is illustrated another aeration device constructed in accordance with a preferred embodiment of the subject invention and designated generally by reference numeral 200. Aeration device 200 is also multi-functional in that it includes a pumping section for delivering well water to a storage tank and an aerating section for injecting air into the well water as water is pumped from the well. The pumping section of device 200 includes a primary water pump 210 configured to operate in the same manner as pump 110 in that it draws well water in through a screened inlet region 216 and moves the well water to a storage tank (e.g., storage tank 18 in FIG. 1) by way of a water supply conduit 214 in a conventional manner.

Figure 3:
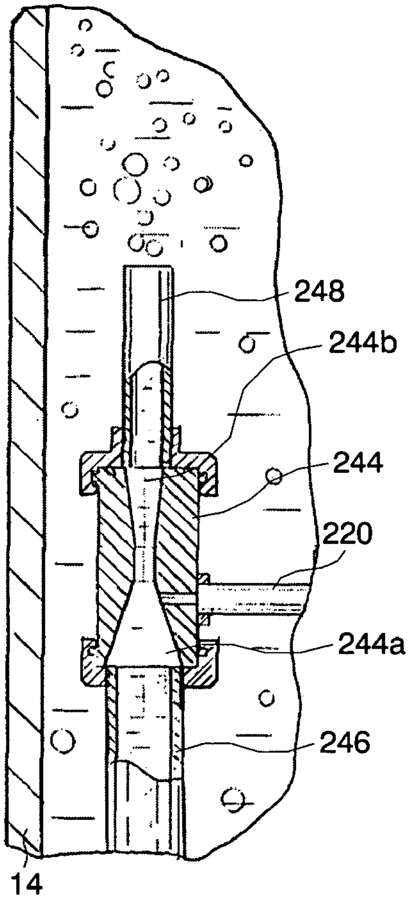
FIG. 3 is an enlarged localized view, in cross-section, of the venturi tube arrangement shown in FIG. 2, which draws air from the surface and discharges aerated water into the well water column.

Aeration device 200 also includes an aerating section consisting of a secondary water pump 240 of suitable horsepower. The secondary water pump 240 draws well water through a screened inlet 242 and conveys the water to a venturi tube assembly 244 by way of a water supply conduit 246. The venturi tube assembly 244, which is best seen in FIG. 3, operates in accordance with the principles of Bernoulli's Law. Thus, as pressurized water from the secondary pump 240 is urged through the inlet 244*a* of venturi assembly 244 at a given velocity and flow rate, air is drawn under pressure into the venturi assembly 244 through an air supply conduit 220. The air supply conduit 220 extends through the vented well cap 16 and communicates with an inlet tube 122. The air and water drawn into the venturi assembly 244 mix together, and the aerated water is then discharged from the outlet 244*b* of venturi assembly 244 through a discharge conduit 248. The exit port of the discharge conduit 246 is located a small distance above the primary pump 210 to ensure that the well water drawn into the primary pump 210 for delivery to the storage tank is effectively aerated. Those skilled in the art will readily appreciate that the configuration of the venturi assembly and the flow parameters of the fluid supplied thereto by the secondary pump can be optimized to achieve the most effective and efficient aeration and pumping conditions for the system.

Once discharged from the venturi assembly 244, the aerated water facilitates the removal of undesirable dissolved solids and gasses from the water column as described above. In addition, the mixture of water and air discharged from the venturi tube 244 creates enhanced circulation within the water column. This enables the primary water pump 210 to operate in a more efficient manner. Preferably, a check valve 225 is disposed in the air supply line to prevent water from backing through the venturi assembly 244 and entering the air supply conduit 220. In addition, an air diffuser 226 may be fit on the exit port of discharge conduit 248 to enhance aeration of the water column.

An electric motor 228 is positioned below the screened inlet 242 of the secondary pump 240 of aeration device 200. Motor 228 is operatively connected to the primary and secondary water pumps 210, 240 for operating both pumps simultaneously. As previously described with respect to aeration device 100, motor 228 is operatively connected to a conventional pressure switch through wiring conduit 230, which, in turn, is wired to a pressure gauge mounted on the storage tank. Thus, the pressure switch starts the motor 228, and hence the primary and secondary pumps 210, 240, when the pressure within the storage tank drops to a certain level, and subsequently stops the motor 128 when the pressure within the storage tank returns to a preset level.

Figure 4:
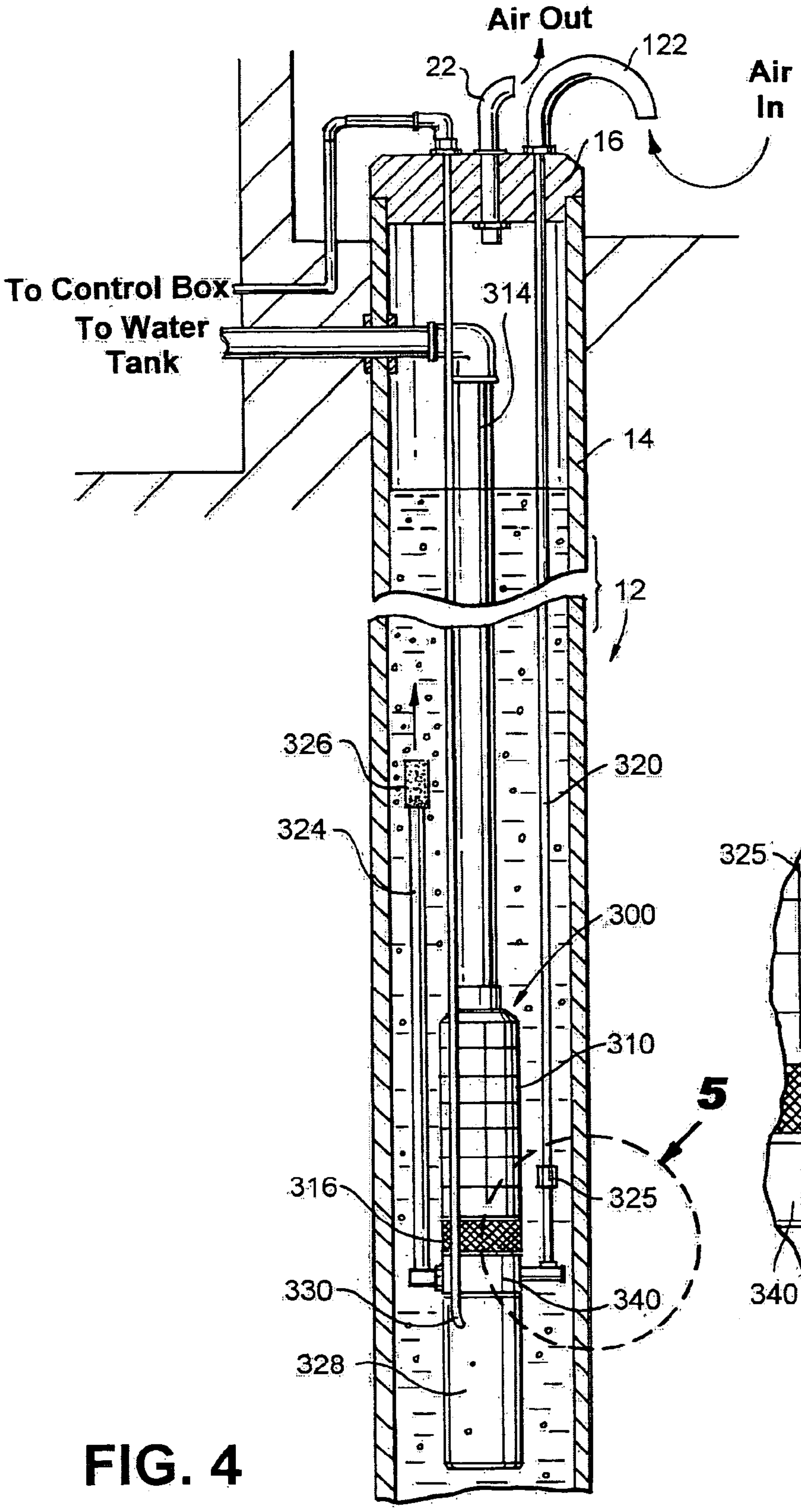
FIG. 4 is a side elevational view in cross-section of a well casing which contains another in-well aeration device constructed in accordance with a preferred embodiment of the subject invention, which has a primary water pumping section for drawing water into the well and a secondary water pumping section which draws water and air into the well and discharges aerated water into the well above the level of the primary water pumping section.

Referring now to FIG. 4, there is illustrated another aeration device constructed in accordance with a preferred embodiment of the subject invention and designated generally by reference numeral 300. Aeration device 300 is also multi-functional in that it includes a pumping section for delivering well water to a storage tank and an integral aerating section for injecting aerated water into the well water column. The pumping section of device 300 includes primary water pump 310 configured to draw well water through a screened inlet region 316 and move the well water to a storage tank (e.g. storage tank 18) by way of a water supply conduit 314 in a conventional manner.

Figure 5:
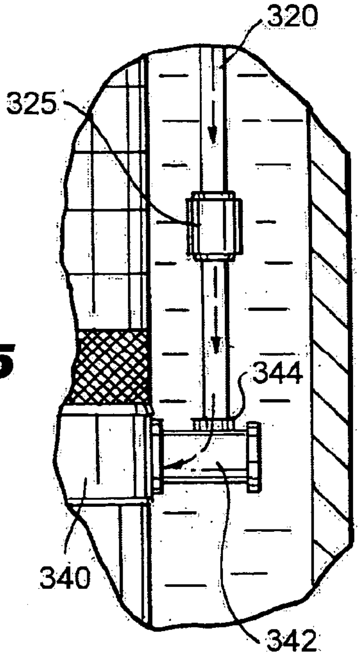
FIG. 5 is an enlarged localized view of the inlet section of the secondary water pump, which forms part of the aerating section of the device illustrated in FIG. 4.

Aeration device 300 also includes an aerating section consisting of a secondary water pump 340 of suitable horsepower. As best seen in FIG. 5, well water is drawn into the impeller stages of the secondary pump 340 through a first inlet port 342. Secondary pump section 340 has a second inlet port 344, which communicates with an air supply conduit 320 that extends through the vented well cap 16 and communicates with an inlet tube 122 at the surface. As water is drawn into the secondary pump 340 through inlet port 342, the suction created by the impeller stage draws air into the secondary pump 340 from supply conduit 320 through check valve 325. The air and water are mixed together within the secondary pump 340, and the aerated water is then discharged into the water column of the well through an outlet conduit 324, as illustrated in FIG. 4. The exit port of outlet conduit 324 is preferably located a small distance above the primary pump 310 to ensure that aerated water is always drawn into the primary pump 310. An air diffuser 326 may be fit at the exit port to enhance aeration, as shown for example in FIG. 4.

As described previously, the aerated water discharged from secondary pump 340 facilitates the removal of undesirable dissolved solids and gasses from the water column. In addition, the aerated water discharged from the secondary pump 340 creates enhanced circulation within the water column. This enables the primary water pump 310 of aeration device 300 to operate more efficiently.

As in each of the previous embodiments of the subject invention, a motor 328 is positioned below the secondary pump 340 of aeration device 300, and is operatively connected to the primary and secondary water pumps 310, 340 for operating both simultaneously. Motor 328 is operatively connected to a conventional pressure switch through wiring conduit 330. The pressure switch functions to start the motor 328, and hence the primary and secondary pumps 310, 340, when the pressure within the storage tank drops to a certain level, and subsequently stops the motor 328 and the pumps 310, 340 when the pressure within the storage tank returns to a preset level.

Although the device of the subject invention has been described with respect to preferred embodiments, those skilled in the art will readily appreciate that changes and modifications may be made thereto without departing from the spirit and scope of the subject invention as defined by the appended claims.

What is claimed is:

1. A device for aerating water in a well casing of a well comprising:

a) a primary water pumping section disposed within the well casing for drawing water from the well;

b) an aerating section disposed within the well casing and operatively connected to the primary water pumping section for drawing air into the well and subsequently injecting the air into the well water above the level of the primary water pumping section; and c) a motor disposed within the well casing and operatively connected to the primary water pumping section and the aerating section for operating both sections simultaneously.

2. A device as recited in claim 1, wherein the aerating section includes a compressor section located below the level of primary water pumping section.

3. A device as recited in claim 2, wherein the compressor section is adapted and configured to draw air into the well through an air inlet tube.

4. A device as recited in claim 3, wherein a check valve is operatively associated with the air inlet tube.

5. A device as recited in claim 2, wherein the compressor section is adapted and configured to discharge compressed air into the well water through an air discharge tube that has an outlet port located above the level of the primary water pumping section.

6. A device as recited in claim 1, wherein the aerating section includes a secondary water pumping section located below the level of the primary water pumping section.

7. A device as recited in claim 6, wherein the aerating section further includes a venturi tube in communication with the secondary water pumping section.

8. A device as recited in claim 7, wherein the venturi tube has a first inlet configured to communicate with the secondary water pumping section and a second inlet configured to communicate with an air inlet tube.

9. A device as recited in claim 7, wherein the venturi tube is adapted and configured to discharge aerated water into the well water through an air discharge tube having an outlet port located above the level of the primary water pumping section.

10. A device as recited in claim 8, wherein a check valve is operatively associated with the air inlet tube.

11. A device as recited in claim 6, wherein the secondary water pumping section has a first inlet communicating with an air inlet tube, and a second inlet located below the level of the water inlet of the primary water pumping section for drawing in well water.

12. A device as recited in claim 11, wherein the secondary water pumping section is adapted and configured to discharge aerated water into the well water through a discharge tube having an outlet located above the level of the primary water pumping section.

13. A device as recited in claim 11, wherein a check valve is operatively associated with the air inlet tube.

14. A device for aerating water in a well comprising:

a) a water pumping section for drawing water from the well;

b) a compressor section located below the level of the water pumping section for drawing air into the well and subsequently injecting the air into the well water above the level of the water pumping section; and c) a motor operatively connected to the water pumping section and the compressor section for operating both sections simultaneously.

15. A device as recited in claim 14, wherein the compressor section is adapted and configured to draw air into the well through an air inlet tube.

16. A device as recited in claim 15, wherein a check valve is operatively associated with the air inlet tube.

17. A device as recited in claim 14, wherein the compressor section is adapted and configured to discharge compressed air into the well water through an air discharge tube that has an outlet port located above the level of the primary water pumping section.

18. A device for aerating water in a well comprising:

a) a primary water pumping section for drawing water from the well;

b) a secondary water pumping section located below the level of the primary water pumping section for drawing air into the well and subsequently injecting the air into the well water above the level of the primary water pumping section; and c) a motor operatively connected to the primary water pumping section and the secondary water pumping section for operating both sections simultaneously.

19. A device as recited in claim 18, wherein the secondary water pumping section communicates with a venturi tube.

20. A device as recited in claim 19, wherein the venturi tube has a first inlet configured to communicate with the secondary water pumping section and a second inlet configured to communicate with an air inlet tube.

21. A device as recited in claim 20, wherein the venturi tube is adapted and configured to discharge aerated water into the well water through an air discharge tube having an outlet port located above the level of the primary water pumping section.

22. A device as recited in claim 20, wherein a check valve is operatively associated with the air inlet tube.

23. A device as recited in claim 18, wherein the secondary water pumping section has a first inlet communicating with an air inlet tube extending through the well cap, and a second inlet located below the level of the water inlet of the primary water pumping section for drawing in well water.

24. A device as recited in claim 23, wherein the secondary water pumping section is adapted and configured to discharge aerated water into the well water through a discharge tube having an outlet located above the level of the primary water pumping section.

25. A device as recited in claim 23, wherein a check valve is operatively associated with the air inlet tube.

* * * * *